United States Patent Office 3,080,406
Patented Mar. 5, 1963

3,080,406
PENTAVALENT DERIVATIVES OF ANTIMONY SALTS OF ORGANIC ACIDS AND METHODS OF PREPARING SAME
Burton S. Marks, Dolton, Ill., and Blaine O. Schoepfle, Niagara Falls, N.Y., assignors to Hooker Chemical Corporation, Niagara Falls, N.Y., a corporation of New York
No Drawing. Filed Dec. 15, 1960, Ser. No. 75,927
8 Claims. (Cl. 260—414)

This invention relates to antimony salts of organic acids and their pentavalent derivatives and to methods of preparing same.

This application is a continuation-in-part of our copending application S.N. 688,143, filed October 4, 1957, now U.S. Patent No. 2,996,528.

An object of the present invention is the product of antimony compounds which are useful as flame-retarding additives. Illustrative of the flame retarding effectiveness of the antimony compounds prepared in accordance with the teachings of this invention are many of the examples given in copending application S.N. 688,111, filed October 4, 1957, now U.S. Patent 3,031,425. These examples show the use of said antimony compounds of this invention as flame retarding agents for various types of polymerizable polyester mixtures and also give comparative burning rate data of said mixtures with mixtures which do not employ the flame retardant antimony compounds prepared in accordance with the teachings of this invention.

A further object is the preparation of such compounds which are capable of being partially or completely hydrolyzed and condensed with suitable materials to polymeric products suitable for use as film forming materials, impregnants, protective coatings and the like.

Further objects include the production of antimony derivatives of organic acids useful in organic syntheses.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In application S.N. 688,143, it was disclosed that the reaction between organic carboxylic acids and antimony trioxide may be carried out readily, leading to the progressive formation of alkyl, aryl, and aralkyl salts of antimony; with conditions being controlled to determine the characteristics of the product obtained. These salts may be designated by the following general formula:

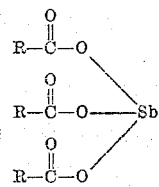

wherein Sb is trivalent antimony and wherein R is selected from the group consisting of an alkyl radical containing from three to twelve carbon atoms, a substituted alkyl radical an aryl radical, and an aralkyl radical. All of the compounds embraced within this general formula are useful as flame-retardant additives, and all can be prepared by the process disclosed hereinafter. The salts thus formed are readily prepared and obtained in substantial yields. The carboxylic acid employed may be of the following types: aliphatic, such as the alkyl carboxylic acids, aryl and aralkyl carboxylic acids. Among the carboxylic acids which may be used, and which represent the foregoing types are: butyric, valeric, caproic, heptylic, caprylic, pelargonic, capric, 2-ethylcaproic, cinnamic acid, and anisic acid. The corresponding antimony salts formed from reacting antimony trioxide with the previously listed carboxylic acids are antimony butyrate, antimony valerate, antimony caproate, antimony heptylate, antimony caprylate, antimony pelargonate, antimony caprate, antimony 2-ethylcaproate, antimony cinnamate, and antimony anisate.

While the process has been referred to above by the reaction of an individual carboxylic acid with antimony trioxide, mixtures of carboxylic acids may be employed if desired, but control of the process is best carried out as further illustrated below in the examples by the use of individual carboxylic acids. The best controlled mixtures of acids used are those which have similar boiling points, e.g. caprylic and 2-ethylcaproic acids.

The antimony reactant employed is antimony trioxide.

The reaction that takes place may be illustrated by that which takes place between antimony trioxide and caprylic acid.

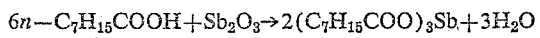

The reaction probably occurs by the stepwise addition of the acid to the antimony trioxide, with loss of water until the equivalent of three moles of acid has been added per mole of antimony atom. The end of the reaction is signaled by no further evolution of water from the reaction mixture, and complies with the theoretical three moles of water.

In general the reaction is carried out by using a given molar quantity of antimony trioxide which is slurried in a large excess of the particular caboxylic acid employed. This reaction mixture is heated to reflux and maintained thusly while water is split out, removed from the reaction and collected in a suitable apparatus such as a Dean-Stark or Barrett water-trap. The end of the reaction is denoted by the elimination of the theoretical quantity of water and further by the fact that the reaction will not eliminate additional water on refluxing.

The process is best carried out by the use of excess carboxylic acid as the solvent. However, other solvents which are unreactive and which are of sufficiently high boiling point to allow the reaction to take place, and concurrent loss of water therefrom may also be employed.

The carboxylic acid used must be of sufficiently high boiling point, generally above one hundred and sixty degrees centigrade, to (1) allow the reaction to go smoothly with the theoretical loss of water and (2) to remain within the confines of the reaction mixture if an additional solvent other than the carboxylic acid is used. Furthermore, it is best that the acid be insoluble or non-miscible with water so that the reaction can be followed easily by noting the quantity of water eliminated.

The loss of water is usually noted by the time a reaction temperature of one hundred and sixty degrees centigrade is reached. Where the carboxylic acid is high boiling and much above one hundred and sixty degrees centigrade the reaction temperature rises as the water distills off. The elimination of water is direct, that is, no vacuum or drying agents are required for its removal. This is so because of the high boiling point reactants employed which permits relatively high reaction temperatures, and a simple distillation of the water formed.

The product is obtained from the reaction mixture by removal of the solvent and this is best accomplished by distillation. Because the solvents that are used are high boiling materials, they are best removed by distillation under reduced pressure, with care to keep the temperature of the product residue sufficiently low to avoid discoloration and decomposition. In order to obtain very high purity product, good purity starting carboxylic acids are used and the reaction is maintained under a dry nitrogen blanket with careful temperature control in the purification step as outlined above. It should be pointed out that since many of the products are heavy viscous, non-distillable oils which can hydrolyze even in the air, good samples for analyses are generally difficult to obtain. As aforesaid the products or antimony salts are in general easily hydrolyzed. The lower molecular weight carboxylic acids yield products which hydrolyze even in the air. Higher molecular weight carboxylic acids yield products much more resistant to hydrolysis.

As previously stated, this invention has as one of its objects the preparation of the pentavalent derivatives of the trivalent antimony salts such as previously listed. Among such derivatives are antimony caproate dibromide, antimony caprylate dibromide, antimony 2-ethylcaproate dibromide, antimony caprylate dichloride, etc.

These pentavalent derivatives are readily prepared by the addition of a halogen such as fluorine, chlorine and bromine which may be added in a stoichiometric quantity to the corresponding trivalent antimony salt. The reaction may be carried out in an inert solvent such as carbon tetrachloride or directly between the reactants without any extraneous solvent. The reaction goes readily in the initial stages and may slow up as the last few percent of halogen is added. The reaction can be followed for example with bromine by the dissipation of the bromine color as the condensation proceeds.

The following examples illustrate the preparation of some of the trivalent antimony salts described hereinbefore:

*Example 1: Preparation of Antimony Caprylate,* $(C_7H_{15}COO)_3Sb$.—In a five hundred ml. flask fitted with thermometer, Barrett water trap, condenser and nitrogen inlet tube, was placed two hundred and fifty grams of distilled caprylic acid and 29.2 grams (0.1 mole) of antimony oxide. The reaction mixture was heated at atmospheric pressure under a nitrogen blanket and at approximately one hundred and sixty degrees centigrade, the evolution of water commenced. The reaction temperature slowly rises as the water distills off, and at approximately the boiling point of the caprylic acid, the theoretical evolution of water is realized, at which point the heating was discontinued.

The reaction mixture was cooled and then filtered, using a filter aid (Dicalite) to yield a yellow amber filtrate which was vacuum distilled (the temperature of the distilling mixture being maintained below one hundred and sixty degrees centigrade) until the unreacted caprylic acid had distilled over. The resultant light brown colored residue, antimony caprylate, solidified at fifty-two degrees centigrade to a brownish white waxy solid. Analysis calculated for $C_{24}H_{45}O_6Sb$: Sb, 22.1. Found: 22.2.

*Example 2: Preparation of Antimony Butyrate,* $(C_3H_7COO)_3Sb$.—In two hundred and fifty grams of butyric acid was suspended 29.2 grams (0.1 mole) of antimony oxide. The reaction mixture was heated under a nitrogen blanket at reflux for two hours, before the butyric acid was allowed to distill over slowly. The brownish colored liquid residue, antimony butyrate was found to hydrolyze rapidly in the presence of moist air. The antimony butyrate can be used without further purification, as a flame retarding agent according to the teachings of said S.N. 688,111.

*Example 3: Preparation of Antimony Cinnamate,* $(C_6H_5CH=CHCOO)_3Sb$.—A mixture of two hundred and fifty grams of cinnamic acid and 29.2 grams (0.1 mole) of antimony oxide was heated together under a nitrogen blanket until the theoretical quantity of water had been distilled over.

The reaction mixture was vacuum distilled with the temperature kept below two hundred degrees centigrade to remove unreacted cinnamic acid. The amber colored liquid residue was poured while still hot and solidified upon cooling. This product, antimony cinnamate, can also be used without further purification as a flame retarding agent according to the teachings of said S.N. 688,111.

*Example 4: Preparation of Antimony Caproate,* $(C_5H_{11}COO)_3Sb$.—In a five hundred milliliter flask fitted with thermometer, Barrett water trap, condenser, and nitrogen inlet tube was placed two hundred and fifty milliliters of caproic acid and 29.2 grams (0.1 mole) of antimony oxide. The reaction mixture was heated to reflux under a nitrogen blanket until the theoretical amount of water had been evolved. The amber-colored reaction mixture was filtered using Dicalite as a filter aid and the filtrate was then subjected to vacuum distillation to remove the excess caproic acid. The residue, a yellowish liquid, was antimony caprolate. Analysis calculated for $C_{18}H_{33}O_6Sb$: Sb, 26.1. Found: 25.7; $n_D^{30°}=1.4780$.

*Example 5: Preparation of Antimony 2-Ethylcaproate,* $(CH_3CH_2CH_2CH_2CH(C_2H_5)COO)_3Sb$.—Antimony 2-ethyl caproate was prepared in the same manner as the preparation of antimony caprylate in Example 1, using instead of caprylic acid, 2-ethyl caproic acid. The product was also an amber-colored oil which tended to solidify on cooling. Analysis calculated for $C_{24}H_{45}O_6Sb$: Sb, 22.1. Found: 22.1; $n_D^{30°}=1.4735$.

The following examples describe the preparation of the compounds of the instant invention.

*Example 6: Preparation of Antimony Caprylate Dibromide,* $(C_7H_{15}COO)_3SbBr_2$.—To a solution of eleven grams of antimony caprylate (0.02 m.) in carbon tetrachloride was added 3.2 grams (0.02 m.) of bromine. The reaction mixture readily dissipated the bromine color up to the addition of eighty percent of the required bromine. The color from the last twenty percent of the bromine added was dissipated slowly on standing. The solvent was removed under water aspiration to yield a heavy orange oil. Further purification was not found to be feasible and the product was analyzed. Analysis calculated for $C_{24}H_{45}O_6SbBr$: Sb, 17.2. Found: 16.8; $n_D^{27°}=1.4950$.

*Example 7: Preparation of Antimony Butyrate Dibromide,* $(C_3H_7COO)_3SbBr_2$.—Bromine is added to a solution of antimony butyrate in carbon tetrachloride. At the completion of the reaction the solvent is distilled leaving antimony butyrate as a product of the process.

The following examples disclose other compounds of the instant invention that are prepared according to the method of Example 7.

*Example 8.*—Antimony cinnamate dibromide,

$(C_6H_5CH=CHCOO)_3SbBr_2$

*Example 9.*—Antimony caproate dibromide,

$(C_5H_{11}COO)_3SbBr_2$

*Example 10.*—Antimony 2-ethylcaproate dibromide,

$(CH_3CH_2CH_2CH_2CH(C_2H_5)COO)_3SbBr_2$

*Example 11.*—Antimony valerate dibromide,

$(C_4H_9COO)_3SbBr_2$

*Example 12.*—Antimony heptylate dibromide,

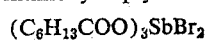
$(C_6H_{13}COO)_3SbBr_2$

*Example 13.*—Antimony pelargonate dibromide,

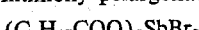
$(C_8H_{17}COO)_3SbBr_2$

*Example 14.*—Antimony caprate dibromide,

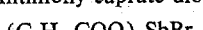
$(C_9H_{19}COO)_3SbBr_2$

*Example 15.*—Antimony anisate dibromide,

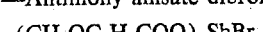
$(CH_3OC_6H_4COO)_3SbBr_2$

*Example 16.*—Antimony caprylate dichloride, $$(C_7H_{15}COO)_3SbCl_2$$

*Example 17.*—Antimony caprylate difluoride, $$(C_7H_{15}COO)_3SbF_2$$

Many of these compounds have been shown to be useful as fire-retarding additives in polyesters in the aforementioned application S.N. 688,111.

Having thus described our invention, what we claim and desire to secure by Letters Patent is:

1. A process for the preparation of pentavalent antimony compounds which comprises reacting an organic antimony compound having the formula:

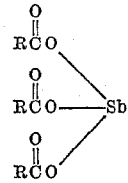

wherein Sb is trivalent antimony and wherein R is selected from the group consisting of alkyl radicals containing from 3 to 12 carbon atoms, aryl radicals and aralkyl radicals; with a halogen selected from the group consisting of fluorine, chlorine, bromide, and mixtures thereof.

2. A process according to claim 1 wherein the halogen is bromine.

3. A composition of matter which has the formula:

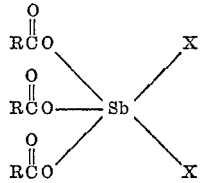

wherein Sb is pentavalent antimony and wherein R is selected from the group consisting of alkyl radicals containing from 3 to 12 carbon atoms, aryl radicals and aralkyl radicals, and wherein X is a halogen selected from the group consisting of fluorine, chlorine, bromine and mixtures thereof.

4. Antimony tricaprylate dibromide.
5. Antimony tributyrate dibromide.
6. Antimony tricinnamate dibromide.
7. Antimony tricaproate dibromide.
8. Antimony tri-2-ethylcaproate dibromide.

References Cited in the file of this patent

UNITED STATES PATENTS 1,917,207     Kaufmann _____ July 4 1933